Patented Sept. 20, 1927.

1,643,261

UNITED STATES PATENT OFFICE

STANLEY COCHRAN SMITH, OF LONDON, ENGLAND.

CONVERSION OF LEAD CHLORIDE TO LEAD CARBONATE.

No Drawing. Application filed May 14, 1924, Serial No. 713,311, and in Great Britain January 30, 1924.

In many processes it is convenient to win lead or to remove lead in the form of lead chloride but this product has not a wide application and owing to the volatility of lead chloride it cannot readily be smelted to yield metallic lead without loss of the metal; further it has not been possible hitherto to treat lead chloride in such a way as to obtain economically not only metallic lead or a lead compound useful in the arts but also at the same time to recover in a form suitable for the treatment of a further quantity of ore the whole of the chlorine radical contained in the lead chloride.

One object of my invention is to provide a simple process by which lead chloride may be converted into the more useful lead carbonate substantially free from chloride.

Another object of my invention is to provide a process by which lead ores, concentrates or residues may be treated for winning or recovering lead by a wet process wherein the lead is obtained chiefly in the form of carbonate and the liquor for extracting the ore is wholly or in part regenerated for re-use.

Another object of my invention is to provide a process by which lead ores, concentrates or residues may be treated for winning or recovering lead by a combined wet and dry method whereby lead in the ore is chloridized by heat and a chloridizing agent, and the lead chloride obtained either by volatilization or leaching is converted into lead carbonate and an alkali chloride, the latter for use in treating another portion of the ore.

My process is applicable to all metallurgical processes which involve the final removal of the lead from the ore as lead chloride, since I am able by simple means to convert the lead chloride into metallic lead or into useful lead compounds and at the same time to recover for use in another cycle of operations the whole of the chloride radical contained in the lead chloride.

No matter what the chloridizing agent employed I can in a cyclic process recover substantially as this chloridizing agent the whole of the chlorine radical contained in the lead chloride.

Lead chloride has a low solubility in water and in order to convert it into carbonate of lead by the use of alkaline carbonates it has hitherto been necessary if a carbonate substantially free from lead chloride is to be obtained, to react in aqueous solution, but on account of the low solubility of lead chloride the volumes of liquors to be dealt with are such that any processes of this kind are devoid of commercial application.

I have found that a chloride of lead can be treated in suspension by a carbonating process under the conditions hereinafter described in such a manner that it can be converted into lead carbonate which may be pure or practically pure and at the same time I obtain all the advantages which would be present were lead chloride a salt having a high order of solubility.

The form of the chloride of lead is not without influence on the conversion process, which is the more rapid the finer the state of subdivision of the chloride and the more amorphous this is. A suitable state of subdivision may be attained by finely grinding the chloride of lead. In the case of lead chloride a suitable form is preferably prepared by adding a strong hot solution of lead chloride in brine to a large excess of cold water so as to precipitate the lead chloride.

In processes in which the lead chloride is obtained by the extraction of an ore or residue with acid brine, a suitable form of lead chloride can be obtained by the rapid cooling of the solution together with agitation.

Another method of obtaining lead chloride that is suitably reactive consists in converting ordinary lead chloride into a double salt of lead chloride that is decomposed by water. The treatment of such double salts by water leaves the lead chloride in a suitable form. Where the salt combined with the lead chloride has no or little subsequent effect on the process the double salt such as a double chloride of lead and ammonium chloride may be used directly in which case the lead chloride in suitable form is produced "in situ".

By the use of a lead chloride of a fine and preferably amorphous state of division such as is prepared in the manner described above or by any other method which gives lead chloride of a similar character I am able economically to effect the complete conversion of lead chloride to lead carbonate in liquors containing a lower concentration of free ammonia, than would be necessary if I employed ordinary crystalline lead chloride.

In most carbonating processes it is customary to maintain the solids in suspension merely by the agitating effect produced by the gas current and I have found that a lead chloride of the type I have described can be treated so as to produce a pure lead carbonate by my process but I have found that if the lead chloride is kept in suspension not only by the passage of the gas current but also by efficient mechanical agitation then I can treat advantageously chloride of lead of a more ordinary character, such as is produced by ordinary crystallization processes, that is to say, I can treat a product having a coarser state of subdivision and a product which may be of a reasonable ordinary crystalline character, such as would be the ordinary product of most processes for producing lead chloride in a wet manner.

I find that the advantage of efficiently agitating the lead chloride mechanically during the passage of the carbon dioxide gas current is very great. I am able to convert in this way a greater quantity of lead chloride per unit volume of liquor, I am able to carbonate much more quickly and I am able to finish with a liquor, after carbonation, containing a low concentration of free ammonia, that is to say I am able to convert a greater percentage of the free ammonia into ammonium chloride.

I prefer to use such a type of agitator that by its effect the gas lying over the surface of the liquor is continuously circulated through the liquor; one type of such agitator is that known as the Gabbett mixer and others of similar character are those used for the aeration of liquors in connection with flotation processes.

According to my invention I proceed in the following manner:—

Chloride of lead is suspended in a solution of ammonia and a current of gases containing carbon dioxide passed through the liquor at any convenient temperature, the lead chloride being maintained in suspension in any well-known manner. The total concentration of the ammonium radicle $NH_4$ present in the solution is maintained by the addition prior to and/or during the process of carbonation of such a quantity of ammonia as may be mechanically carried away by the gas current or in other manner.

The temperature and concentration of ammonia chosen should preferably be such that the tension of ammonia in the liquor is not such that a high percentage of the ammonia originally present in the liquor leaves the latter mechanically during carbonation.

The quantity of lead chloride taken in relation to the total weight of solution will be such that the suspension produced can be mechanically handled and the ratio of the weight of ammonia to the weight of lead chloride in the suspension should be such that the weight of ammonia is in excess of that which would be chemically equivalent to the weight of the lead chloride.

The passage of the carbon dioxide or gases containing carbon dioxide is continued for any convenient period preferably until the liquor is saturated with the gas and no further appreciable absorption occurs. Heat is evolved during this process and may, if excessive, be removed by cooling. It is advantageous that the partial pressure of the carbon dioxide in the gases used should be as high as possible and may exceed one atmosphere.

The solids present in the suspension are now separated from the liquor by filtration or in other known manner, when, depending upon the conditions chosen, the solids will be lead carbonate which may also contain lead chloride.

The liquor prepared as above is now divided into two portions each of known weight, one of which portions is hereinafter described as the nucleus liquor and the other as the residual liquor. The weight of the nucleus liquor may approach to zero. The residual liquor is analyzed. To the nucleus liquor is now added (1) A quantity of water equal to that contained in the residual liquor together with that otherwise removed from the system.

(2) A quantity of ammonia equal in weight to or slightly in excess of the total weight of that contained as combined and free ammonia in the residual liquor.

(3) A quantity of lead chloride chemically equivalent to or slightly less than the weight of ammonium chloride contained in the residual liquor, 278 parts of lead chloride being equivalent to 107 parts of ammonium chloride.

Now under the same conditions as those under which the nucleus and residual liquors were prepared carbon dioxide gases are passed through the liquor prepared by the addition of the above materials to the nucleus liquor, the solids being maintained all the time in suspension until no further appreciable absorption occurs, and there has been absorbed by the suspension such a quantity of carbon dioxide as is equivalent to the lead chloride added plus the amount present in the residual liquor previously referred to.

Heat is evolved during this process and, if excessive, may be removed by cooling.

The total concentration of the ammonium radicle $NH_4$ present in the solution is maintained by the addition prior to and/or during the process of carbonation of such a quantity of ammonia as may be mechanically carried away by the gas current or otherwise.

It is advantageous that the partial pressure of the carbon dioxide in the carbon dioxide gases used should be as high as possible and may exceed one atmosphere.

The solids are now separated from the liquor by filtration or in other known manner when it will be found that the product after washing with water to remove mother liquor is pure or practically pure lead carbonate.

The liquor is now divided into two portions, the nucleus liquor and the residual liquor. To the nucleus liquor is now added ammonia, lead chloride and water in the manner previously described and the cycle of operations repeated.

The residual liquor is treated for the recovery of the combined and free ammonia and carbonic acid usually by distillation first by steam and then with alkaline substances, such as lime or in other known manner.

The relative weights of nucleus liquor and residual liquor may be such that, as previously mentioned, the weight of the nucleus liquor approaches zero and becomes so small that it may be neglected, that is to say, the whole of the liquors after separation of the solids is treated for the recovery of the ammonia in which case the subsequent addition of lead chloride is made to a liquor initially free from ammonium chloride.

I may proceed in the manner whereby the carbon dioxide is absorbed in part in the ammonia prior to the introduction of the chloride of lead, that is to say, I may carry out my process by treating lead chloride in suspension with a solution containing ammonia in which has previously been absorbed carbon dioxide, the precise conditions being determined in the manner described as though the carbon dioxide were to be absorbed in the liquor whilst the lead chloride is in suspension, that is to say, I do not limit myself to the addition of the necessary reagents in the order I have described; I may vary or modify this in order to conform with the most suitable method of carrying out the process.

I may treat the lead chloride during the carbonating process after the manner of counter currents in a continuous or intermittent system involving a number of stages, that is to say, I cause the fresh lead chloride to undergo the preliminary stages of the carbonating process in that liquor in the process which has the lowest concentration in free ammonia (by free ammonia is to be understood ammonia in solution as such or combined with carbonic acid) and which has already been employed in the carbonation of partly carbonated lead chloride, and by causing the partly or almost completely carbonated solid before leaving the process to be subjected in the presence of carbonic acid to the action of the liquor containing the highest concentration of free ammonia. By this means the lead chloride is subjected either continuously or intermittently to the action of carbonic acid and solutions in which the concentration of "free" ammonia is increasing, and the original ammoniacal liquor, as its concentration of ammonia is decreasing, is treating a solid, in which the percentage of carbonic acid is decreasing, i. e. one in which the percentage of lead chloride is increasing. If I desire to reduce as far as possible the concentration of carbonic acid gas in the effluent gases when I am passing gases containing carbon dioxide through the suspension of lead chloride and liquor, I may cause the gas, containing the highest concentration of carbon dioxide to come first in contact with the liquor containing the lowest concentration of free ammonia and cause the gases containing the lowest percentage of carbon dioxide to pass before leaving the process, through liquor, containing the highest concentration of free ammonia, the process being carried out in stages or continuously.

For example, 400 parts of weight of lead chloride prepared by precipitation from brine as above described are suspended in 1000 parts by weight of water containing 140 parts by weight of ammonia ($NH_3$). Carbon dioxide is passed through the liquor whilst the solids are kept in suspension by mechanical agitation. The temperature is kept at about 30° C. and when there is no further appreciable absorption of carbon dioxide the process is stopped. The solids are separated from the liquor and are washed with a little water when they will be found to consist of practically pure lead carbonate.

I have found that the temperature of the liquor during the process of carbonation has a definite influence on the process. I can obtain good results by keeping down the temperature of the liquors during the carbonation process, in, say, the neighbourhood of 30° C. yet if I cause or allow the temperature of the liquor to rise, then I am able to convert a greater quantity of lead chloride per unit volume of liquor treated, and I am able to transform completely lead chloride into lead carbonate obtaining at the same time, a liquor after the carbonation process, containing a low percentage of free ammonia, that is to say, I convert a larger percentage of free ammonia into ammonium chloride at each cycle of operations.

It will be understood that the weight of ammonia mechanically carried away in the effluent gas current is dependent entirely, ceteris paribus, on the vapour tension of the ammonia in the liquor, which in turn increases rapidly with rise in temperature. In order therefore to prevent an undue loss of ammonia by causing or allowing the temperature of the liquor to rise whilst the concentration of free ammonia in the liquor is high, I pass the carbon dioxide through the suspension, keeping down the temperature of the liquor, whilst the concentration of free ammonia is high; then when, by reason of the reactions occurring in the suspension, the vapour tension of the ammonia in the liquor is reduced I allow or cause the temperature of the liquor to rise say to 40° C.–50° C. and complete the carbonation at that temperature. By this means in the example given I may increase the weight of lead chloride to 800 grams and still obtain a pure carbonate of lead.

According to my process I am able to convert a chloride of lead directly and completely into lead carbonate which may be of a high order of purity. I am able to convert substantially the whole of the chloride of lead into lead carbonate without losses. By my process I am also able to obtain relatively concentrated solutions of ammonium chloride which may be used in a lead extraction process and also from which the ammonia may be economically recovered by the use of lime or other alkali with a low consumption of fuel.

I am able to obtain such concentrated solutions of ammonium chloride that after the carbonation process and removal of the lead carbonate they are saturated in respect to ammonium chloride at a temperature higher than that of the atmosphere or at atmospheric temperature so that by cooling, either by ordinary methods and/or by artificial refrigeration, I can separate solid ammonium chloride. I can then employ the liquor from which the ammonium chloride has been separated as the medium in which I suspend a further quantity of lead chloride in order to convert it into lead carbonate in another cycle of operations. It will be seen that my process provides a method for the manufacture of ammonium chloride which involves no concentration by evaporation of ammonium chloride liquors, and a process in which such manufacture of ammonium chloride need not necessitate the use of artificial refrigeration. My process is of great value for this reason since the concentration by evaporation of ammonium chloride solution is a very difficult operation on account of the corrosive action of the liquor.

I am further able to obtain after treatment of the ammonium chloride with lime a concentrated solution of calcium chloride containing substantially all the chlorine originally associated with the chloride of lead which I may use in the process of extracting further quantities of lead from the ore or residue.

My process may advantageously be used in the treatment of any residues containing lead compounds soluble in neutral or acid solutions of brine or other chlorides.

For instance, in many metallurgical operations zinc sulphide ores containing lead compounds are roasted to render the zinc soluble in a solution of sulphuric acid for the extraction of the zinc, leaving behind a residue containing lead and silver sulphate if any silver were present in the original ore.

I treat this residue with a hot chloride solution which may contain a little acid to dissolve the lead and silver compounds, the liquor is separated from the solids and any silver in the liquor is now removed in known manner, on cooling the solution lead chloride separates and is removed by filtration, settling or in other known manner. The lead chloride if not already in the form required for rapid conversion into lead carbonate may be converted into such form and is then treated in the manner already described with ammonia and carbonic acid gas. The hot solution of ammonium chloride thus produced may be used as the hot chloride solution for dissolving further quantities of lead and silver, and/or I may distil the ammonium chloride liquors with lime for the recovery of the ammonia and the production of a hot chloride solution for the extraction of further quantities of lead and silver when lead chloride is again produced and the cycle of operations repeated.

When ammonium chloride or sodium chloride is used as the solvent for the lead and silver compounds it will be found that ammonium sulphate or sodium sulphate accumulates in the leaching liquor and must be removed, for instance, by treatment with calcium chloride, prepared as described or in other known manner, for instance, by barium chloride, particularly where the latter substance has been prepared by precipitation of solutions containing zinc chloride as described in the specification to my United State patent application No. 713,310.

With reference to the removal of silver from the solution of lead chloride obtained in leaching the ore with an acid chloride solution it is to be noted that by introducing metallic lead (preferably reduced chemically in known manner) the silver can be so completely precipitated that the lead carbonate subsequently prepared from the lead chloride is free from silver and yields, on calcination, a litharge which is valuable because free from silver.

Where I use the ammonium chloride produced by the treatment of lead chloride with ammonia and carbonic acid for the treatment of further quantities of residues, I remove from time to time from the leaching liquors, a quantity of such liquor and recover the ammonia from such liquor in known manner in order to provide the ammonia necessary to continue the cycle of operations.

In the case of the now well-known treatment of lead-zinc sulphide ores, concentrates and the like, consisting in heating the ore with an acid in presence of a chloride which causes the lead to pass into solution, and separating the hot solution from the zinc sulphide, the invention can be applied by first pouring the hot chloride solution into plenty of cold water so as to obtain the lead chloride in active form or by causing the hot chloride solution to deposit the lead chloride in as finely divided a form as possible for instance, by quick cooling and agitation.

This lead chloride is then treated in the manner already described and the residual liquor containing ammonium chloride is heated with lime to expel ammonia for collection and re-use and to obtain a solution of calcium chloride which serves as the chloride or as part of the chloride for extracting a fresh portion of the ore.

Or the calcium chloride or a part of it is treated with sulphuric acid to produce calcium sulphate as a by-product and hydrochloric acid to be used for treatment of a further quantity of the ore.

I may particularly, where I am treating an ore or residue, containing lead sulphate decompose the ammonium chloride liquor by distillation with barium sulphide, as a ground solid or in solution using this material instead of lime, so as to liberate ammonia and sulphuretted hydrogen, which are separated in known manner. The resulting barium chloride solution, after filtration or clarification by settling, is then employed for the precipitation of sulphates accumulating in the leaching liquor, for example, in brine which has been employed for dissolving the lead originally present as sulphate in the ore or residue. The barium sulphate so formed may be reduced by carbon to give the barium sulphide required to continue the cycle of operations.

When I prefer to distil the ammonium chloride liquors with the use of lime, I may treat the calcium chloride liquors so formed with barium sulphide, either as a ground solid or in solution, with carbonic acid gas, in order to convert the calcium chloride into the soluble barium chloride, at the same time precipitating the calcium as calcium carbonate.

I may use solid ammonium chloride, produced by my process, as the chloridizing agent for converting the lead sulphide in the ore into lead chloride by a dry process, in which case I heat the lead sulphide ore with ammonium chloride whereby lead chloride is formed, and ammonia and sulphuretted hydrogen are evolved. I separate then the ammonia and sulphuretted hydrogen in known manner and utilize the ammonia in another cycle of operations; the lead chloride I separate from the ore in known manner by leaching or volatilization.

My process is applicable to methods of winning lead which involve the heating of a lead sulphide ore with chloride of zinc or in a melt containing chloride of zinc, whereby lead chloride and zinc sulphide are formed. I separate the lead chloride from the melt in known manner and after converting the lead chloride into lead carbonate convert the ammonium chloride into ammonia and zinc chloride by any series of known reactions; for instance, I calcine the zinc sulphide to zinc oxide. I distil the ammonium chloride with lime to form calcium chloride and ammonia. I then suspend the zinc oxide in the solution of calcium chloride and carbonate it in known manner to give a solution of zinc chloride and calcium carbonate, the zinc chloride after removal of the water I use in another cycle of operations, or I may convert the zinc sulphide into zinc sulphate and cause this to react with the calcium chloride to give zinc chloride and calcium sulphate, the zinc chloride after dehydration to be used in another cycle of operations.

In the application of my process to the treatment of lead sulphide and ores, concentrates, residues and the like, containing lead sulphide, I may first of all submit the ore to a sulphating roast and then extract the lead in a hot neutral or slightly acid brine, cool the solution to separate the lead chloride and treat this lead chloride in the manner described to give lead carbonate and an alkali chloride for use in another series of operations. I may remove in this case the sulphates from the leaching liquor in the manner I have already described.

I may heat an ore, concentrate, residue or the like, containing lead sulphide with an alkali chloride in order, by a chloridizing roast, to convert the lead sulphide into lead chloride. I may then extract this lead chloride in known manner convert it into lead carbonate and an alkali chloride in the manner I have described, and then utilize this alkali chloride for for the treatment of a further portion of the material.

I may apply my process to the conversion of metallic lead into lead carbonate by first converting the lead into lead chloride by dissolving the lead in hydrochloric acid, ferric chloride or the like to produce lead chloride, then treating this lead chloride in the manner I have described to produce lead carbonate and distilling the ammonium chloride formed with an alkali to produce an alkali chloride and ammonia, the latter for use in a further cycle of operations, and the alkali chloride for furnishing the hydrochloric acid, ferric chloride or the like in another cycle of operations.

In this way I may utilize my invention for the production of pure lead carbonate and hence lead oxide from impure forms of lead such as hard or work lead base-bullion etc. and also from lead drosses, since I am able after treatment of such materials with an acid brine or other chloride, hydrochloric acid, ferric chloride and the like to separate from the solution pure or practically pure lead chloride.

My process in like manner may be applied for the treatment of lead oxide containing silver in which the lead oxide is treated so as to produce a hot solution of lead chloride and silver chloride. The solution of lead chloride containing the silver chloride is treated with metallic lead so as to precipitate metallic silver, the lead chloride solution is cooled so as to separate lead chloride which is then treated in the manner I have described to produce lead carbonate.

A further application of my process is the manufacture of ammonium chloride by the treatment of lead sulphate, or materials containing lead sulphate, with brine so as to produce lead chloride which is then treated so as to give lead carbonate and ammonium chloride.

In like manner I may treat calcium chloride or other suitable chlorides, such as magnesium chloride, with lead sulphate, or materials containing lead sulphate, so as to produce lead chloride which I may then convert into lead carbonate and ammonium chloride. Particularly as a source of calcium chloride I may use the waste liquors of the ammonia soda process, either before or after removal of the sodium chloride and the lime. I may use these liquors whilst they are still hot as they leave the process and treat the lead sulphate or materials containing lead sulphate with these hot liquors so as to dissolve the lead sulphate, then I may cool these liquors so as to separate lead chloride. I may further dilute with water these cooled liquors so as further to separate lead chloride and finally I may remove any lead chloride still left in the liquors by treatment with metallic zinc, sulphuretted hydrogen or lime or in other known manner.

The lead carbonate produced according to the invention, when not required for the market, is heated to decompose it into lead oxide and carbon dioxide, the latter being used for treating a further quantity of lead chloride.

It will be seen that my process affords a method of manufacturing ammonium chloride from chlorides, such as zinc chloride, magnesium chloride, brine, calcium chloride, etc. without necessarily the use of hydrochloric acid, in a cyclic process. Thus, for example, the lead carbonate produced I can readily convert by gases containing sulphuretted hydrogen into lead sulphide which in turn I can reconvert into lead chloride by known methods, some of which I have indicated either by first forming lead sulphate or otherwise.

Having thus fully described the nature of my said invention and the best means I know of carrying the same into practical effect, I claim:—

1. A process of converting lead chloride into lead carbonate which consists in suspending a chloride of lead in an aqueous solution of ammonia in excess of that equivalent to the lead chloride and passing carbon dioxide through the suspension.

2. A process of converting a chloride of lead into lead carbonate which consists in suspending a chloride of lead in an aqueous solution of ammonia and passing carbon dioxide through the suspension.

3. A process in which lead chloride is treated in a solution containing ammonia with a current of carbon dioxide gas to produce lead carbonate, and in which the solids are kept in suspension not only by the effect of the passage of the gas current but also by efficient mechanical agitation.

4. A process in which lead chloride in suspension is treated in a solution containing ammonia with a current of carbon dioxide gas to produce lead carbonate, and in which the temperature of the liquor is kept low during the first stages of carbonation and raised during the later stages of carbonation.

5. A process in which lead chloride in suspension is treated in a solution containing ammonia with a current of carbon dioxide gas to produce lead carbonate and in which the temperature of the liquor is kept in the neighbourhood of 30° C. during the first stages of carbonation and in which it is raised to the neighbourhood of 40° C.–50° C. during the later stages of carbonation.

6. A process of converting a chloride of lead into lead carbonate which consists in suspending a chloride of lead in an aqueous solution of ammonia, containing ammonium chloride, and passing carbon dioxide through the suspension.

7. A process of converting a chloride of lead into lead carbonate which consists in suspending a chloride of lead in an aqueous solution of ammonia, containing ammonium carbonate, and passing carbon dioxide through the suspension.

8. A process of converting a chloride of lead into lead carbonate which consists in suspending a chloride of lead in an aqueous solution of ammonia, passing carbon dioxide through the suspension, separating the lead carbonate thus produced from the solution of ammonium chloride formed, heating at least a portion of the last named solution with an alkaline substance adapted to expel ammonia from a solution of an ammonium salt to expel ammonia and absorbing this ammonia in water for re-use.

9. A process of converting a chloride of lead into lead carbonate which consists in suspending a chloride of lead in an aqueous solution of ammonia, passing carbon dioxide through the suspension, separating the lead carbonate thus produced from the solution containing ammonium chloride also formed, heating at least a portion of the last named solution to expel volatile ammonia and carbon dioxide, and then with an alkaline substance adapted to expel ammonia from a solution of an ammonium salt to expel the fixed ammonia, and using the carbon dioxide and the ammonia in the process of converting another portion of lead chloride.

10. A process of converting a chloride of lead into lead carbonate which consists in suspending a chloride of lead in an aqueous solution of ammonia, passing carbon dioxide through the suspension while maintaining constant the total ammonium radicle present in the solution, separating the lead carbonate thus produced from the liquor, dividing the liquor into two parts, analyzing one part of the liquor, adding to the other part of the liquor (1) a quantity of water substantially equal to that contained in the part analyzed, (2) a quantity of ammonia substantially equal to that contained as both combined and free ammonia in the part analyzed, (3) a quantity of a chloride of lead substantially chemically equivalent to that of the ammonium chloride in the part analyzed, and passing carbon dioxide through the part to which these additions have been made, the conditions of temperature and pressure being the same as those which prevailed in making the liquor which was divided into two parts.

11. A process of converting a chloride of lead into lead carbonate which consists in suspending a chloride of lead in an aqueous solution of ammonia, passing carbon dioxide through the suspension while maintaining constant the total ammonium radicle present in the solution, separating the lead carbonate thus produced from the liquor, dividing the liquor into two parts, analyzing one part of the liquor, adding to the other part of the liquor (1) a quantity of water substantially equal to that contained in the part analyzed, (2) a quantity of ammonia substantially equal to that contained as both combined and free ammonia in the part analyzed (3) a quantity of a chloride of lead substantially chemically equivalent to that of the ammonium chloride in the part analysed, passing carbon dioxide through the part to which these additions have been made, the conditions of temperature and pressure being the same as those which prevailed in making the liquor which was divided into two parts, separating the lead carbonate thus formed, dividing the liquor into two parts, making the additions aforesaid to one part and passing carbon dioxide through it as before and heating the other part first alone to recover carbon dioxide and free ammonia from it and then with an alkaline substance adapted to expel ammonia from a solution of an ammonium salt to recover fixed ammonia from it and using the ammonia and carbon dioxide to act upon a fresh portion of lead chloride.

12. A process of recovering lead from ores, concentrates, residues or the like, which contain lead compounds soluble in brine or other solutions of chlorides, which consists in treating the material with a hot chloride solution, separating the undissolved matter from the hot liquor, cooling the hot liquor so as to produce lead chloride, separating the lead chloride from the liquor, treating the lead chloride according to claim 11 and using for the treatment of a fresh portion of the material the alkali chloride produced by the treatment of the solution with an alkaline substance for the recovery of the fixed ammonia.

13. A process of recovering lead from ores, concentrates, residues or the like, which contain lead compounds soluble in brine or other solutions of chlorides, which consists in treating the material with a hot chloride solution, separating the undissolved matter from the hot liquor, cooling the hot liquor so as to produce lead chloride, separating the lead chloride from the liquor, treating the lead chloride according to claim 11 using lime as the alkali for the recovery of the fixed ammonia and using the solution of calcium chloride thus produced for treating another portion of the residue.

14. A process of recovering lead from ores, concentrates, residues or the like which contain lead compounds soluble in brine or other solutions of chlorides, which process consists in treating the material with a hot chloride solution, separating undissolved matter from the hot liquor, cooling the hot liquor so as to produce lead chloride, suspending the lead chloride in an aqueous solution of ammonia, passing carbon dioxide through the suspension, separating the lead carbonate thus produced from the solution of ammonium chloride which is formed, heating at least a portion of this solution with lime to recover ammonia and to form an aqueous solution of calcium chloride and using this solution of calcium chloride for treating another portion of the residue.

15. A process of treating lead zinc sulphide ores, concentrates and the like, which consists in heating the ore with an acid in the presence of a solution of a chloride which causes the lead to pass into solution, cooling the hot liquor so as to produce lead chloride, treating the lead chloride according to claim 11, and using for the treatment of a fresh portion of the material the alkali chloride produced by the treatment of the solution with an alkaline substance for the recovery of the fixed ammonia.

16. A process of treating lead zinc sulphide ores, concentrates and the like, which consists in heating the ore with an acid in the presence of a solution of a chloride which causes the lead to pass into solution, cooling the hot liquor so as to produce lead chloride, treating the lead chloride according to claim 11, using lime as the alkali for the recovery of the fixed ammonia and using the calcium chloride thus produced to treat another portion of the ore.

17. A process of treating lead zinc sulphide ores, concentrates and the like which consists in heating the ore with an acid in presence of a solution of a chloride which causes the lead to pass into solution, separating the hot liquor, cooling the hot liquor so as to produce lead chloride, suspending the lead chloride in an aqueous solution of ammonia, passing carbon dioxide through the suspension, separating the lead carbonate thus produced from the solution of ammonium chloride which is formed, heating at least a portion of this solution with lime to recover ammonia and to form an aqueous solution of calcium chloride and using this solution of calcium chloride for treating another portion of the material.

In testimony whereof I have signed my name to this specification.

STANLEY COCHRAN SMITH. [L. S.]